United States Patent

[11] 3,604,337

| [72] | Inventor | James M. Rago<br>12604 S. Michigan Avenue, Chicago, Ill.<br>60628 |
|---|---|---|
| [21] | Appl. No. | 46,254 |
| [22] | Filed | June 15, 1970 |
| [45] | Patented | Sept. 14, 1971 |

[54] VALVE FITTED COFFEE PERCOLATOR
6 Claims, 7 Drawing Figs.

| [52] | U.S. Cl. | 99/312 |
|---|---|---|
| [51] | Int. Cl. | A47j 31/04 |
| [50] | Field of Search | 99/308,<br>310, 311, 312, 313, 314, 315 |

[56] References Cited
UNITED STATES PATENTS

| 2,437,768 | 3/1948 | Timberlake | 99/308 |
| 2,845,018 | 7/1958 | Turke | 99/308 |
| 2,882,811 | 4/1959 | Kass | 99/312 |
| 3,439,602 | 4/1969 | Gazzo | 99/312 |

*Primary Examiner*—Robert W. Jenkins
*Attorney*—Dominik, Knechtel & Godula

ABSTRACT: A percolator coffee pot having a tube through which percolating liquid passes for discharge through the open top, and a valve cap freely resting on the top of said tube. The valve cap seals the open top of the tube in closed position, and the valve cap undergoes limited movement under urgings of percolating liquid to bring spray discharge means in the wall of the valve cap into communication with the percolating liquid moving through the top of the tube.

PATENTED SEP 14 1971

3,604,337

INVENTOR
James M. Rago

BY
Dominik, Knechtel & Godula
ATTYS.

VALVE FITTED COFFEE PERCOLATOR

This invention relates to an improved percolator coffee pot, in particular, to a coffee pot which can receive ground coffee into the percolator basket without undesirable passage into the tube, as well as permitting percolation without undesired solid deposits into the percolated coffee.

The percolator type of coffee pot is extremely popular, such pot utilizing heat to move water through a tube and into contact with coffee in a percolator basket. Such pots commonly employ a dispersing body positioned above the open top of the tube so that water bubbling out of said tube splashes against the dispersing member and thereby breaks into water droplets which spray onto the coffee in the basket. Most commonly, the basket has a lid with a plurality of openings so the sprayed hot water passes therethrough and seeps through the coffee bed in the basket. The percolation process continues until the original water in the container is replaced by brewed coffee of desired strength.

Several problems commonly occur in the percolation of coffee. Filling the coffee basket with freshly ground coffee is a procedure which must be carefully executed because the finely ground coffee particles can easily fall into the open top of the percolating tube. This leads to solid deposits or sediment in the brewed coffee which is not pleasant to the consumer. Even when great attention is directed to placing the fine coffee grounds in the basket, there is a strong likelihood that coffee grounds will pass into the percolating tube. Another frequently annoying problem arises from introduction of solid deposits into the brewed coffee during the percolation process. A basket lid is generally provided to reduce the effects of this problem. The percolating hot liquid tends to agitate the finely ground coffee particles and carry them so that a portion thereof pass into the open top of the tube. This problem is understandably reduced by employing a basket lid, but such lids have not satisfactorily eliminated the problem. The turbulent action of the percolating liquid droplets can still lead to moving coffee solids through the openings in the basket lid, and at least a portion of such solids are introduced into the open top of the tube. Such solids participate in forming the recognized sediment in the brewed coffee which is undesirable. Said solid deposits may adversely effect the taste qualities in the brewed coffee in the opinion of many consumers, as well as detracting from the appearance of a cup of brewed coffee. Most consumers will understandably prefer viewing a cup which is substantially free of such solid deposits after the major portion of the coffee has been consumed. Depending on the strength of the brewed coffee, such deposits may even be observable through the body of brewed coffee in the cup. Filter paper may be successfully used in lining the bottom of a coffee basket to reduce solid deposits passing through the bottom of the basket, but such filter paper is totally ineffective in meeting the problem of solid deposits passing through the open top of the percolating tube.

In view of the foregoing discussion it is one principal object of the present invention to provide a percolator coffee pot which permits the user to quickly deposit freshly ground coffee in the basket without exercising attention or concern about preventing passage of coffee into the open percolating tube.

Another important object of the present invention is to provide an improved percolator coffee pot in which a valving action is provided at the top of the open percolating tube so that hot liquid may be discharged as a spray in valve open position, but such valving action stops the top of the open tube when the hot liquid is not being sprayed therethrough. When the top of the tube is thusly stopped, solid deposits may not pass into the tube during the percolating process.

Still yet another important object of the present invention is to provide an improved coffee percolator coffee pot in which improved percolation is obtained by obtaining a substantially circular spray pattern through a valve cap so that substantial areas of the coffee basket are contacted by the sprayed water droplets. Such an improved spray pattern leads to more efficient percolating process to obtain improved brewed coffee for given amounts of ground coffee.

The foregoing objects are obtained by the invention which is presented in the following disclosure. It will be appreciated that still other objects attainable by the present invention will become apparent to practitioners. The following disclosure includes drawings wherein.

Figure 1:
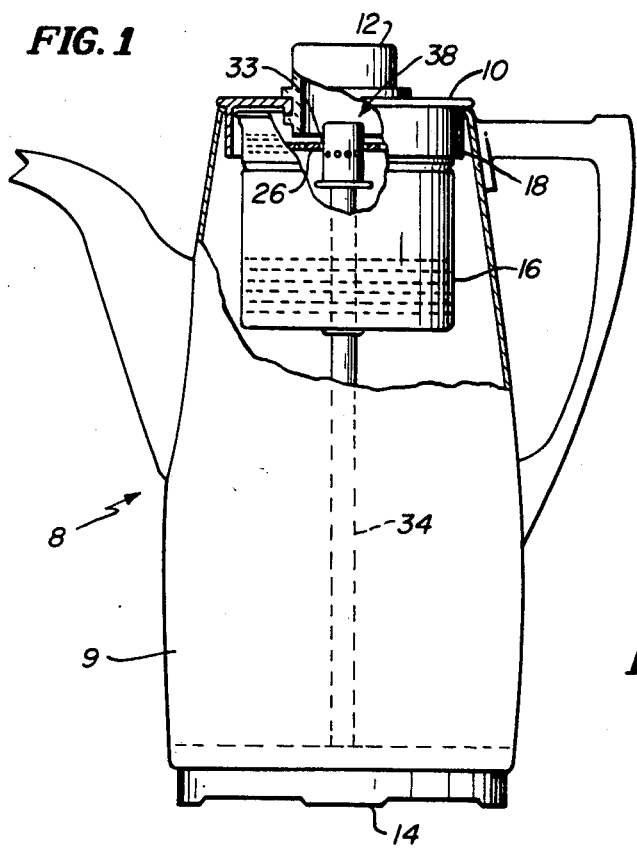
FIG. 1 is a side elevational view of a percolator coffee port equipped for valving action at the top of the percolating tube.
Figure 3:
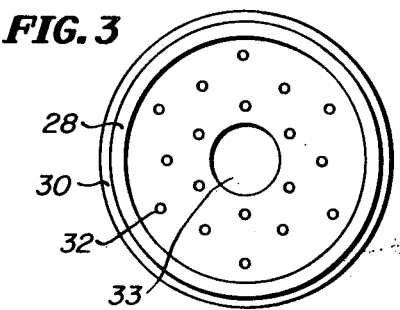
FIG. 3 is a top plan view of the coffee basket shown in FIG. 2, but with a mounted lid.
Figure 4:
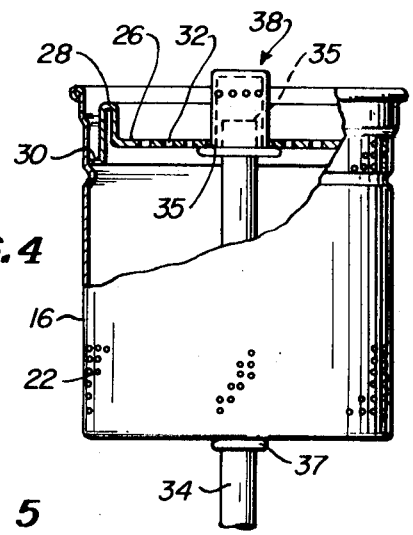
FIG. 4 is a side elevational view similar to that of of FIG. 2, but with a mounted lid.
Figure 2:
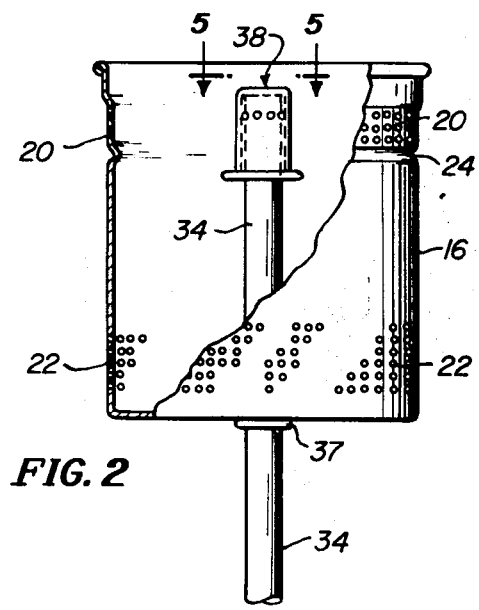
FIG. 2 is a side elevational view of the assembly including the coffee basket, percolating tube, and valve cap on an enlarged scale.
Figure 5:
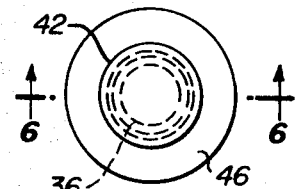
FIG. 5 is a view of the mounted valve cap taken along line 5—5 of FIG. 2 but on an enlarged scale.

The view of FIG. 1 shows how a conventional percolating coffee pot is combined with the valving action to provide an improved apparatus. The conventional features of the percolating coffee pot, shown generally as 8 include a liquid container 9, a cover 10 provided with a glass dome 12; and the handle and spout not identified by numerals. The bottom of the liquid container is shown fitted with an electrical coil heating member, indicated only by its casing 14. A coffee basket 16 is shown positioned in the upper part of the liquid container, and the upper portions of such basket are overlapped by skirt 18 of the cover 10.

The basket 16 is shown as having a cylindrical shape with the sidewall of the basket having a continuous top perforated area 20 and a spaced, continuous bottom perforated area 22. The perforated areas are formed by a plurality of small openings so that the liquid may pass therethrough following a coffee extraction process. The outside of the basket is shown with a continuous groove or indentation which takes the form of a continuous bead support 24 on the inside of the basket.

The basket lid is a circular member having a raised peripheral wall 28. The raised wall 28 is shown as formed by a prebent portion of the circular lid member. A continuous shoulder 30 is also formed by the prebent portion of the circular lid member. The shoulder is seated on the bead support 24 when the lid is in position. The top of the lid is provided with a perforated area 32 comprised of a plurality of small openings. The top of the lid has a central circular opening 33 which is slightly oversized relative to the diameter of a percolating tube 34.

The percolating tube 34 has a bottom open end which extends toward the bottom of the liquid container, as indicated in dotted line in the view of FIG. 1. The opposite end of the tube has an open top 35 formed by a continuous top edge 36. The tubular wall is shown provided with a ring support 37 to hold the basket 16 in a selected position. The bottom of the basket has a central opening, not shown, similar to the opening 33 in the lid. The bottom of the basket may also be provided with a perforated area similar to that indicated at 20 and 22 in the sidewall of the basket.

Freely positioned on the continuous top edge 36 of the tube is a valve cap shown generally as 38. The valve cap rests on the top edge in valve closed position, as will be later described. The cap has a bottom open end 40 and an opposite top closed end 42. The cap is cylindrical in shape and has a continuous wall 44. The bottom of the continuous wall, at the bottom open end 40, is provided with a continuous flange 46. The diameter of the flange 46 is greater than the diameter of the circular opening 33 so that movement of the valve cap is limited from the top of the percolating tube 34. The continuous wall 44 of the valve cap is provided with an annular spray discharge means 48, shown as a circular row of small openings. The row is in a plane which is normal to the longitudinal axis of the tube 34. This allows complete opening and closing during the valving action.

Figure 7:
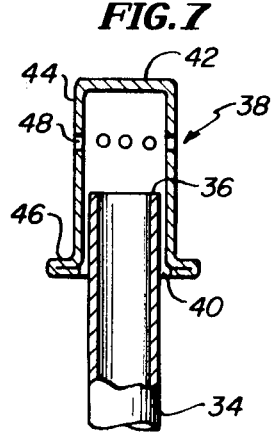
FIG. 7 is a view similar to that of FIG. 6, but showing the assembly in open valve position.

In operation, the heated liquid in container 9 rises through tube 34 and impinges against the closed end or top wall 42 of the valve cap 38. The action of the water moves the cap off the top edge 36 of the tube 34 to valve open position as indicated in the view of FIG. 7. The hot liquid which moves out of the open end 40 of the tube 34 then passes out the annular spray discharge 48. The discharged hot liquid spray or droplets pass over and drop onto the basket lid 26. The spray is advantageously discharged in a circumferential manner, that is, 360° relative to the valve cap 38. Such a spray pattern also leads to a more efficient brewing action in that the coffee within the basket is contacted with the hot liquid in an improved manner.

Figure 6:
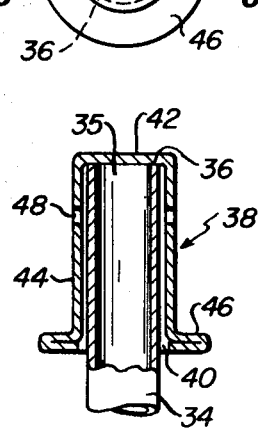
FIG. 6 is a view mostly in section of the percolating tube and valve cap assembly in closed valve position.

When the hot liquid is not impinging the top wall 42 of the valve cap to move said cap into valve open position, the valve cap will return to the valve closed position where the top wall 42 sits on the top edge 36 of the tube 34. This position is illustrated in the view of FIG. 6. In the valve closed position, the circular row of openings 48 adjoin the tubular wall, therefore presenting no communication with hot liquid within the tube 34. This valve closed position is operative when preparing the percolating coffee pot for brewing. Ground coffee may be quickly deposited into the basket 16 by the user without experiencing any concern or exercising any undue care to prevent such grounds from entering the open end 35 of the tube 34.

The valving action of the cap 38 effectively counteracts tendencies of solids to enter the open end of the tube 34, during the brewing process. When the cap is in the valve open position, hot liquid is moving out of the annular spray discharge under pressure, thereby preventing entry of any solids carried by liquids previously discharged. When such hot liquid is not being discharged through the annular spray means 48, the cap moves to the valve closed position to thereby effectively prevent any liquids which contain solids exterior to the tube 34 from entering the open end of such tube. The result of such an improved percolating coffee pot is to obtain brewed coffee substantially free of any solid deposits.

The claims of the invention are now presented.

What is claimed is:

1. In a percolator coffee pot having a liquid container, a tube with a bottom opening extending to the floor of the container, and a top opening extending through a perforated coffee basket which has a perforated lid with a central opening, the improvement which includes, in combination, a valve cap freely resting on the top opening of the tube, said valve cap having a top wall, a continuous sidewall, the top wall freely engaging the top of the tube in closed valve position, openings in the continuous sidewall out of communication with liquid in the tube when the cap is in closed valve position, said continuous wall with said openings movable to open valve position under urgings of percolating liquid passing through said tube, said liquid discharging through said openings in said valve open position onto said perforated lid, and means at the bottom of said valve cap and below said lid, said means having dimensions greater than the larger dimension of said central lid opening to limit the movement of said valve cap from the top of said tube.

2. In a percolator coffee pot as in claim 1, wherein said central lid opening is circular, and said valve cap is cylindrical.

3. In a percolator coffee pot as in claim 2, wherein said means to limit movement of the valve cap from the top of said tube is a continuous flange at the bottom, said flange having a diameter greater than the diameter of said circular lid opening.

4. In a percolator coffee pot as in claim 2, wherein said openings extend circumferentially in said continuous wall of the valve cap so that an annular spray discharge pattern of the liquid over the top of the perforated lid may be obtained.

5. In a percolator coffee pot as in claim 1, wherein said valve cap is cylindrical, said cap having an open bottom and an entirely closed top wall, said means to limit the movement of the valve cap from the top of said tube being a continuous flange extending along the open bottom of said valve cap, the central opening in said lid being circular and slightly oversized relative to the diameter of the valve cap formed by the continuous cylindrical wall so that said cap may move freely through said circular opening, the diameter of the continuous flange being greater than the diameter of said circular opening to limit movement of the cap through said opening, and the openings in said continuous wall forming an annular spray discharge to allow said liquid to be sprayed substantially over the entire surface of the perforated lid.

6. In a percolator coffee pot as in clam 5, wherein said annular spray discharge is formed by a circular row of openings in the continuous wall of the valve cap, said circular row lying in a plane substantially normal to the longitudinal axis of the tube, said circular row of openings adjoining the tube in valve closed position, and said circular row of openings movable above the top of said tube in valve open position under the urging of the percolating liquid.